Figure 1:
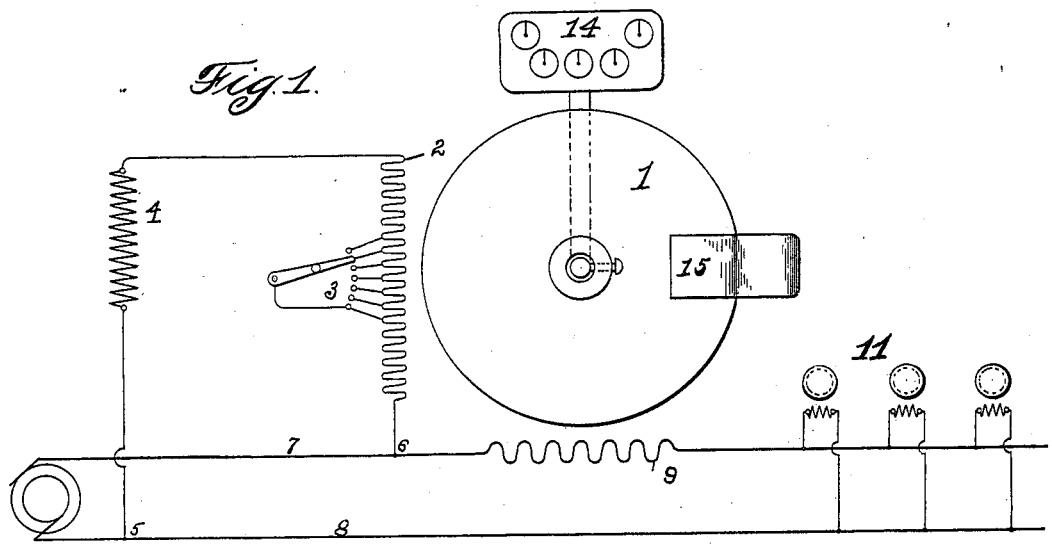

No. 698,655. Patented Apr. 29, 1902.
T. DUNCAN.
ALTERNATING CURRENT MOTOR METER.
(Application filed Sept. 18, 1899. Renewed Oct. 14, 1901.)

(No Model.)

Witnesses:

Inventor:
Thomas Duncan
By Charles A. Brown & Cragg
Attorneys.

THE NORRIS PETERS CO., PHOTO-LITHO., WASHINGTON, D. C.

UNITED STATES PATENT OFFICE.

THOMAS DUNCAN, OF CHICAGO, ILLINOIS, ASSIGNOR TO THE SIEMENS & HALSKE ELECTRIC COMPANY OF AMERICA, OF CHICAGO, ILLINOIS, A CORPORATION OF ILLINOIS.

ALTERNATING-CURRENT MOTOR-METER.

SPECIFICATION forming part of Letters Patent No. 698,655, dated April 29, 1902.

Application filed September 18, 1899. Renewed October 14, 1901. Serial No. 78,569. (No model.)

*To all whom it may concern:*

Be it known that I, THOMAS DUNCAN, a citizen of the United States, residing at Chicago, in the county of Cook and State of Illinois, have invented a certain new and useful Improvement in Motor-Meters, (Case No. 270,) of which the following is a full, clear, concise, and exact description, reference being had to the accompanying drawings, forming a part of this specification.

My invention relates to improvements in motor-meters, and has for its object the provision of a meter that will measure the so-called "wattless" component of a central-station output.

As is known to those skilled in the art, the current of an alternating-current system may be divided into two components, one of which is in phase with the electromotive force of the circuit and the other of which components has a lag of ninety degrees. It is this latter component which constitutes the magnetizing or wattless component of the output of alternating-current central stations. The methods and means for measuring this lagging component of the current are inaccurate and clumsy. The usual method is to make a comparison of the indicated volt-amperes obtained by multiplying the reading of an indicating-voltmeter by the reading of an indicating ampere-meter with the output in watts obtained from an integrating wattmeter. The latter instrument gives the average watts during a certain interval of time, and the volts and amperes are obtained by successive readings of the switchboard indicating instruments. As an illustration of what may happen in obtaining results by this crude method we may assume that the watts in a circuit, as obtained through successive readings of an integrating wattmeter, are five thousand, the average voltage being one thousand and the average current a little less than five amperes. The lag in the circuit would then be slight, and the indications of the integrating wattmeter would give very nearly the apparent watts in the circuit. Owing to the temporary fluctuations in a circuit due to motors, the current indicated may for an instant be four amperes, which unusual fluctuation would not be apparent in the readings of the integrating wattmeter to any extent. There would then apparently be a power factor of more than one hundred per cent., the power factor representing the ratio of the true watts to the apparent watts, the apparent watts being obtained by the product of the indications of the switchboard-ammeter and switchboard-voltmeter.

The importance of a means for measuring accurately and instantly the lagging component of the current is apparent in central stations which supply alternating current to motors of considerable size and number. The difficulty in regulations which is experienced under these conditions does not arise from the amount of energy which these motors require, which is, as a rule, no more than that of direct-current motors carrying the same load, but from the influence of the lagging or wattless currents resulting from the various inductances of the circuit. Even when the lagging current is measured by a comparison of volt-amperes with watts indicated by instruments of the same type and comparatively calibrated accurate results are not obtained. For example, if the volt-amperes or apparent watts exceed the true watts by only one per cent. it means that there is upon the line a wattless or magnetizing current with a strength fully fourteen per cent. of that of the energy-current. If the excess is two per cent., the magnetizing-current is twenty per cent. as great as the energy-current—that is to say, if the true watts are one hundred and the apparent watts one hundred and one the lagging component, which is found by taking the square root of the difference of the squares of the true and apparent watts, will be fourteen, and if the true watts are one hundred and the apparent watts one hundred and two the lagging component will be twenty. From these illustrations it will be apparent that very great and disturbing variations of the wattless output affect but slightly the indicated volt-amperes.

An attempt to secure approximate compensation for the lagging component always existing with induction-motors is sometimes made by the use of synchronous motors for large loads. By means of the synchronous motors a leading current may be produced to balance the lagging component due to the induction-motors. The amount of leading or lagging current which the synchronous motors will introduce into the system depends upon the excitation of their fields, and the setting of the field-rheostats which determine this excitation is made by the crude process of what is called "adjusting for minimum current," which will reduce the difference between the apparent and true watts in the circuit to a minimum. The current, however, is subject to fluctuations often as high as seventy-five per cent., and since a variation of only two per cent. in the minimum means the introduction of a twenty-per-cent. magnetizing-current it is readily seen that this method of attempted regulation leaves much to be desired.

In running alternating-current generators in multiple it is well known that the division of the load cannot be adjusted by varying the field excitation of any one or more of them, nor can the load of one machine be measured by ampere-meters. Any variation of the field excitation only causes a change of the voltage and a consequent cross magnetizing-current from one machine to the other, demagnetizing one and building up the field of the other to an equality. This cross magnetizing-current should for minimum heating and maximum efficiency be kept as small as possible; but hitherto there has been no means to measure it with accuracy. To provide an instrument to measure this cross magnetizing-current accurately and readily and to measure and indicate (or integrate) the lagging or wattless component of an alternating-current system is the object of my present invention.

My invention in its preferred embodiment is in the form of an induction motor-meter.

In practicing my invention in connection with an induction motor-meter I subject a movable element to two fields produced by an alternating-current circuit, one of which is maintained in phase with the impressed electromotive force of that circuit, the movable element being adapted to show the lag of the current behind the impressed electromotive force.

I will describe a specific embodiment of my invention by reference to the accompanying drawings, in which—

Figure 2:
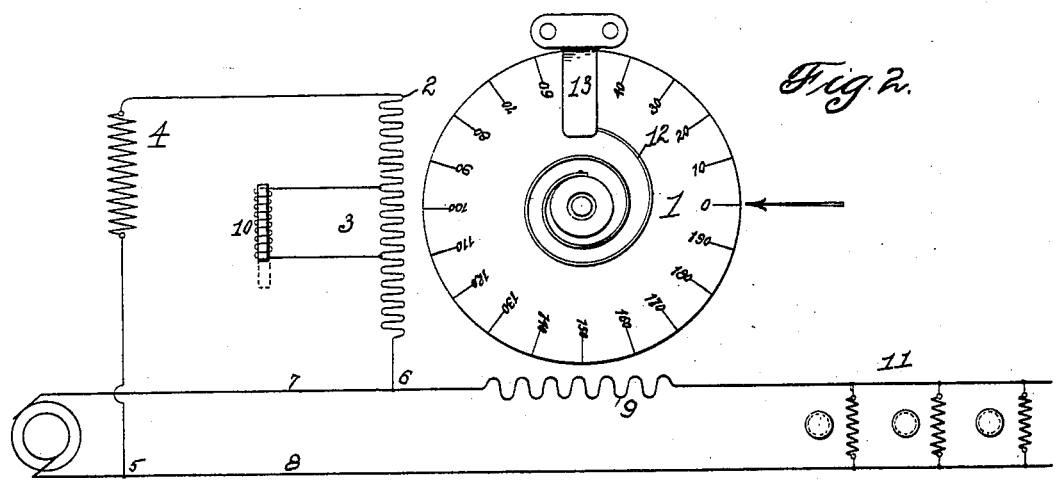
Figure 3:
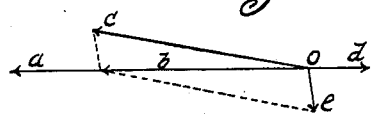

Figure 1 is a diagrammatic representation of the circuits and apparatus of an integrating meter. Fig. 2 is a diagrammatic representation of the circuits and apparatus of an indicating-meter. Fig. 3 is a vector diagram showing the relations in the circuits of a system embodying my invention.

Similar characters of reference indicate similar parts in the figures.

The armature 1 is within the field of the series coil 9 and the shunt-coil 2, both connected with the alternating-current circuit 7 8, with which is connected the inductive load 11. If the load were non-inductive, the current and impressed electromotive force at the translating devices are in phase with each other, and the magnetism of the shunt-coil 2 and the series coil 9 will also be in phase with each other. Consequently no torque is exerted upon the armature when no lag exists between the electromotive force and the current of the work-circuit. This is one essential of the meter for the wattless component of an alternating current. The other essential is that when the current does lag the torque shall vary as the sine of the angle of lag and be a maximum when that angle is ninety degrees.

To obtain a magnetic field in the shunt or pressure field 2 that is in phase with the electromotive force, I connect a non-inductive resistance 4 in series with the said field-coil, thereby causing its current to be nearly in phase with the pressure; but since it is impracticable to eliminate all the inductance on account of the winding of the coil 2 I employ a subsidiary circuit shunted around a portion of the convolutions of the coil.

The relations of the currents in the circuits described are represented by the vector diagram of Fig. 3. The current from the leads 7 8 through the coil 2 is represented by the line $o\,c$, which lags somewhat behind $o\,a$, the line representing the impressed electromotive force. By means of the subsidiary circuit in shunt to a portion of the windings of coil 2 a counter electromotive force $o\,d$ and its resulting current $o\,e$ is produced in this circuit, which produces the resultant $o\,b$. This resultant is the current and magnetism of the shunt field-coil 2 and is in phase with the electromotive force $o\,a$. The magnitude and angle of $o\,e$ are varied for the purpose of bringing $o\,b$ in phase with $o\,a$ by including more or less of the convolutions of the coil 2 in the circuit 3 or, as is shown in Fig. 2, by varying the self-induction of the adjustable impedance-coil 10.

Fig. 2 shows the application of the circuits and means of my invention to an indicating instrument. The movable element in this case is a disk 1, which is pivoted at its center, but is held by a suitable spring 12, attached to the disk and also to the arm 13. The disk will tend to rotate under the influence of the torque set up by the series and shunt fields when there is a lagging current. A stationary index or pointer is placed opposite a point on the perimeter of the disk when there is no turning effort exerted thereon. From this as the zero-point the perimeter of the disk is marked off in so-called "wattless" or "magnetizing watts."

I have indicated the counting-train 14 and the retarding-magnet 15, which do not require description in detail, as they are well known to those skilled in the art.

While I have shown a specific embodiment of my invention in its preferred form, numerous modifications of this device may be made without departing from the spirit of my invention. I believe it is broadly new with me to provide an induction-meter the movable element of which is maintained at rest when there is no lag of the current behind the impressed electromotive force and which is adapted to be moved by the magnetizing-current, and I desire my claims to cover the means for accomplishing this result.

Having thus described my invention, what I claim as new, and desire to secure by Letters Patent, is—

1. In a device of the class described, the combination with an armature of a series and a shunt coil in inductive relation therewith, and means for creating a counter electromotive force in said shunt-coil whereby the magnetic effect of said shunt-winding is advanced in phase to uniformity with that of the impressed electromotive force of the circuit, said armature moving proportionally to the magnetic field due to the said fields and shunt-coils, substantially as described.

2. In a device of the class described, the combination with an armature of a series and a shunt winding in inductive relation therewith, a non-inductive resistance in series with said shunt-winding and a subsidiary circuit in shunt to said shunt-winding and including adjustable means for producing a counter electromotive force in said shunt-winding, said armature moving proportionally to the magnetic field due to the said field and shunt windings, substantially as and for the purpose specified.

3. In a device of the class described, the combination with an armature of a series and a shunt winding in inductive relation therewith, a non-inductive resistance in series with said shunt-winding, a subsidiary circuit in shunt to said shunt-winding, and adjustable means for including more or less of said shunt-winding in said subsidiary circuit, said armature moving proportionally to the magnetic field due to the said field and shunt windings, substantially as and for the purpose specified.

4. In an induction motor-meter, the combination with a revoluble armature of a series and a shunt winding in inductive relation therewith, a resistance-coil in series with said shunt-winding, a subsidiary circuit in shunt to said shunt-winding, adjustable means for producing a counter electromotive force in said shunt-winding, a retarding device associated with said armature and means for indicating the movement of said armature, said armature moving proportionally to the magnetic field due to the said field and shunt windings.

5. In a device of the class described, the combination with an armature, of a series and a shunt coil in inductive relation therewith, means for creating a counter electromotive force in said shunt-coil whereby the magnetic effect of said shunt-winding is advanced in phase to uniformity with that of the impressed electromotive force of the circuit, and means for indicating the magnetic effect of the lag of the current behind said electromotive force, substantially as described.

6. In a device of the class described, the combination with an armature of a series and a shunt winding in inductive relation therewith, a non-inductive resistance in series with said shunt-winding, a subsidiary circuit in shunt to said shunt-winding and including adjustable means for producing a counter electromotive force in said shunt-winding, and means for indicating the magnetic effect of the lag of the current behind said electromotive force, substantially as and for the purpose specified.

In witness whereof I hereunto subscribe my name this 13th day of September, A. D. 1899.

THOMAS DUNCAN.

Witnesses:
CHARLES A. BROWN,
GEORGE L. CRAGG.